United States Patent [19]
Suzuki et al.

[11] Patent Number: 5,706,378
[45] Date of Patent: Jan. 6, 1998

[54] METHOD OF PRODUCTION OF OPTICAL WAVEGUIDE MODULE

[75] Inventors: Kenji Suzuki; Takashi Shigematsu, both of Tokyo, Japan

[73] Assignee: The Furukawa Electric Co., Ltd., Tokyo, Japan

[21] Appl. No.: 626,946

[22] Filed: Apr. 3, 1996

[30] Foreign Application Priority Data

Apr. 7, 1995 [JP] Japan .................... 7-82187

[51] Int. Cl.⁶ .................................. G02B 6/30
[52] U.S. Cl. ..................... 385/49; 385/50; 385/52
[58] Field of Search ....................... 385/49, 50, 52, 385/53, 59, 60, 65, 71, 83, 88, 89

[56] References Cited

U.S. PATENT DOCUMENTS

| | | | |
|---|---|---|---|
| 4,605,819 | 8/1986 | Warburton | 174/127 |
| 4,818,059 | 4/1989 | Kakii et al. | 385/65 |
| 5,044,711 | 9/1991 | Saito | 385/65 |
| 5,171,942 | 12/1992 | Powers | 174/129 R |
| 5,197,109 | 3/1993 | Ichigi et al. | 385/50 |
| 5,325,451 | 6/1994 | Hartman et al. | 385/49 |

FOREIGN PATENT DOCUMENTS

| | | |
|---|---|---|
| 0 591 941 A1 | 4/1994 | European Pat. Off. |
| 0 606 552 A1 | 7/1994 | European Pat. Off. |

*Primary Examiner*—John D. Lee
*Attorney, Agent, or Firm*—Nikaido, Marmelstein, Murray & Oram LLP

[57] ABSTRACT

An optical waveguide chip assembly in which a plurality of optical waveguide patterns and two positioning grooves are laterally arranged is prepared by forming a plurality of optical waveguide patterns and two positioning grooves on a wafer in parallel to each other and cutting the wafer. Separately from this, an optical fiber array assembly having a plurality of optical fiber array cables and two guide pin holes is prepared. The optical waveguide chip assembly and the optical fiber array assembly are joined while aligning by the guide pins and then divided into units of individual optical waveguide modules. A large number of optical waveguide modules can be made with a good efficiency, and the mass productivity is improved. Since a plurality of optical waveguide modules are made by the same positioning, variations among products can be reduced.

10 Claims, 9 Drawing Sheets

METHOD OF PRODUCTION OF OPTICAL WAVEGUIDE MODULE

BACKGROUND OF THE INVENTION

1. Field of the Invention

The present invention relates to a method of production of an optical waveguide module formed by connecting an optical waveguide chip and an optical fiber array cable.

2. Description of the Related Art

Conventional optical waveguide modules have been made by dividing a wafer on which a plurality of optical waveguide patterns are formed by a dicer etc. to obtain an optical waveguide chip.

The end face of the optical waveguide chip is polished, then the optical waveguide chip and an optical fiber array cable with a similarly polished end face are centered and connected by an binder etc. to obtain an optical waveguide module.

A method of making an optical waveguide module which does not require centering has also been proposed. In this method, first, a plurality of optical waveguide patterns are formed on the wafer and positioning grooves (V-grooves) are formed in the wafer positioned at the two sides of each optical waveguide pattern in parallel to the light axis of the optical waveguide patterns. Next, the wafer is divided by a dicer or the like to obtain an optical waveguide chip with positioning grooves. On the other hand, at the end of the optical fiber array cable is attached an optical connector having guide pin holes at its two sides. This optical connector and the optical waveguide chip are then connected positioned by the guide pins to make the optical waveguide module.

In all of the conventional methods of production, however, the optical waveguide modules are produced by cutting the wafer to separate the optical waveguide chips one by one and by connecting each optical waveguide chip with an optical fiber array cable.

For this reason, with a method of connection involving centering, the steps of polishing the end face, centering, connection, and affixing are required for every optical waveguide module.

Even with the method of connection not involving centering, it is necessary to form two positioning grooves for every optical waveguide pattern and the steps of polishing the end face and connection are required for every optical waveguide module.

For the above reasons, optical waveguide modules are poor in mass productivity and have become very expensive.

Further, both in the case of a method of connection involving centering and a method of connection not involving centering, the optical waveguide and the optical fiber array cable have to be individually positioned for every optical waveguide module, so there also exists a problem of possible variations among products.

Note that Japanese Unexamined Patent Publication (Kokai) No. 7-5335 discloses a method of producing an optical waveguide module which can be precisely cut into desired lengths.

In the method of producing an optical waveguide module shown in this publication, a plurality of optical waveguide chips are integrally formed, so the end faces of the chips can be polished at the same time. However, the optical fiber array cable sides are individually made, so it is necessary to form holes or grooves for positioning with the optical fiber array cable on both sides of every optical waveguide pattern. Therefore, a plurality of optical waveguide modules could not be made at one time with a good productivity.

SUMMARY OF THE INVENTION

The present invention was made in consideration with these circumstances and has as an object thereof to provide a method of production of an optical waveguide module with which a large number of optical waveguide modules can be made at one time with a good efficiency, which is excellent in mass productivity, and can reduce variations among products.

So as to attain the above object, the present invention provides a method of production of an optical waveguide module including a step of forming on a wafer in parallel to the planar direction a plurality of optical waveguide patterns for every chip with a plurality of core regions formed at the internal portion of a clad layer; a step of forming at least two positioning grooves on the wafer in parallel to a longitudinal direction of the optical waveguide patterns; a step of cutting the wafer to prepare an optical waveguide chip assembly formed with a plurality of optical waveguide patterns corresponding to a plurality of chips and at least two positioning grooves; a step of preparing an optical fiber array assembly having a plurality of optical fiber array cables corresponding to each of the plurality of optical waveguide patterns of the optical waveguide chip assembly and at least two positioning portions corresponding to the two positioning grooves of the optical waveguide chip assembly; a step of connecting the end face of the optical waveguide chip assembly and optical fiber array assembly while aligning the positioning grooves of the optical waveguide chip assembly with the axial center of the positioning portions of the optical fiber array assembly; and a step of dividing the connected optical waveguide chip assembly and optical fiber array assembly into units of individual optical waveguide modules.

Preferably, a plurality of optical waveguide patterns of lengths corresponding to at least two optical waveguide chips are formed on the wafer along the longitudinal direction of the optical waveguide patterns and the wafer is cut to obtain at least two optical waveguide chip assemblies. This is so as to further improve the mass productivity.

Preferably, a package connection type connector is connected to the end faces of the plurality of optical fiber array cables so as to form an optical fiber array assembly. This is to facilitate the fabrication of the optical fiber array assembly.

The package connection type connector is integrally formed at the end of the plurality of optical fiber array cables so that a glass frame and shaped plastic member are arranged in that order from the frontmost end. The glass frame is arranged at the frontmost end because this is convenient for the bonding using an ultraviolet-curable binder.

Preferably, the connector is formed with guide pin holes serving as the positioning portions of the optical fiber array assembly and wherein the positioning relative to the positioning grooves of the optical waveguide chip assembly is carried out by guide pins with one end fit in the guide pin holes and the other end fit in the positioning grooves. This is to facilitate the positioning.

Preferably, a cover is bonded to the assembly from the top of the optical waveguide chip assembly so as to press down the guide pins at a position where the other ends of the guide pins are fit in the positioning grooves of the optical waveguide chip assembly. This is to improve the precision of the positioning. Also, it is convenient in that the cover serves as reinforcement in the later step of cutting to divide the assembly into individual optical waveguide modules.

Preferably, the package connection type connector is formed by so as to sandwich and affix the end of each optical fiber of a plurality of optical fiber array cables between a glass base formed with first grooves for positioning of the optical fibers and second grooves for positioning of the guide pins and a glass plate. The construction of the connector is not particularly limited.

In the method of production according to the present invention, it is sufficient so far as only two positioning grooves are made for the plurality of optical waveguide patterns. Also, single steps of polishing of the end faces, positioning, and connection for the plurality of optical waveguide patterns and plurality of optical fiber array cables are enough. Accordingly, the assembly process can be greatly shortened compared with the conventional method of production. Further, a plurality of optical waveguide patterns and a plurality of optical fiber array cables are positioned by the same positioning grooves, so the variation of the connections among individual optical waveguide modules becomes smaller.

BRIEF DESCRIPTION OF THE DRAWINGS

These and other objects and features of the present invention will become more apparent from the following description of the related art and preferred embodiments made with reference to the attached drawings, in which.

DESCRIPTION OF THE PREFERRED EMBODIMENTS

Before describing the preferred embodiments of the invention, a more detailed explanation will be made of the related art with reference to the drawings for backpolished.

Conventional optical waveguide modules have been made as in the following way.

Figure 1A:
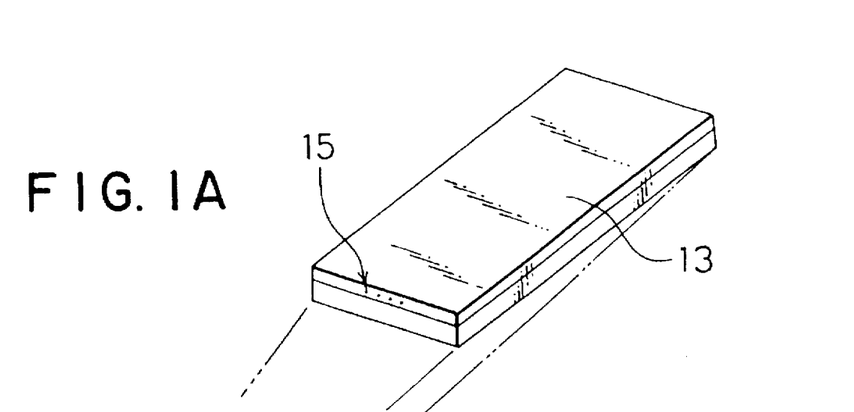
Fig. 1 is a perspective view of an initial step in an example of a conventional method of production.
Figure 1B:
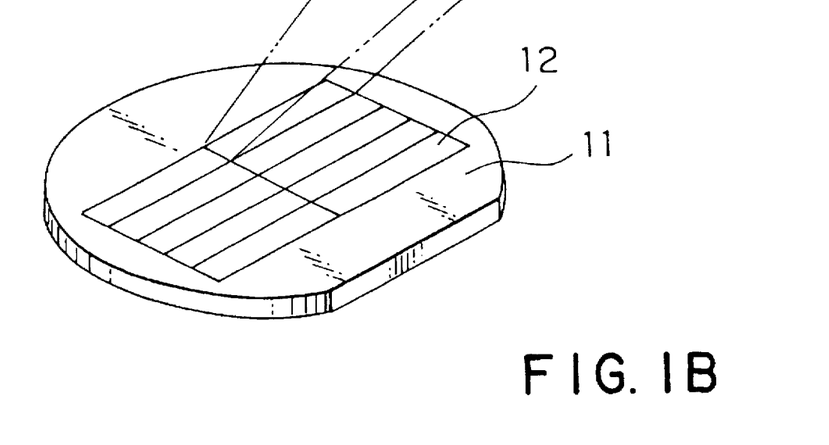

First, as shown in FIG. 1, a wafer 11 on which a plurality of optical waveguide patterns 12 are formed is divided by a dicer etc. to obtain an optical waveguide chip 13.

Figure 2:
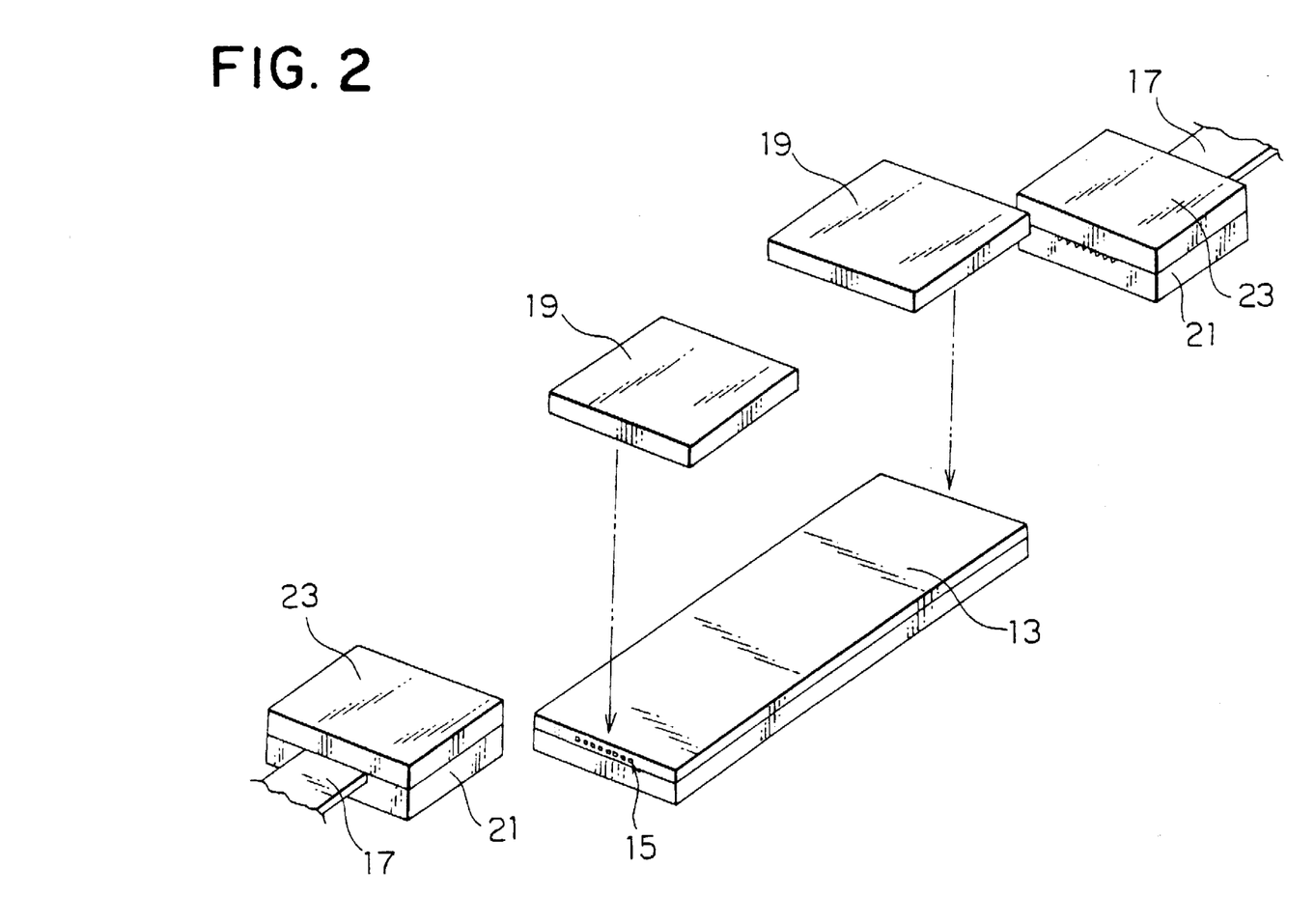
FIG. 2 is a perspective view of an intermediate step of the same.

Next, the end face 15 of the optical waveguide chip 13 is polished, then, as shown in FIG. 2, the optical waveguide chip 13 and an optical fiber array cable 17 with a similarly polished end face are centered and connected by a binder etc. to obtain an optical waveguide module. In FIG. 2, reference numeral 19 denotes a reinforcing plate of the optical waveguide chip 13, reference numeral 21 denotes a V-groove base for the end of the optical fiber array cable 17, and reference numeral 23 denotes a cover. These members 19, 21, and 23 are generally all made of glass plates.

Figure 3:
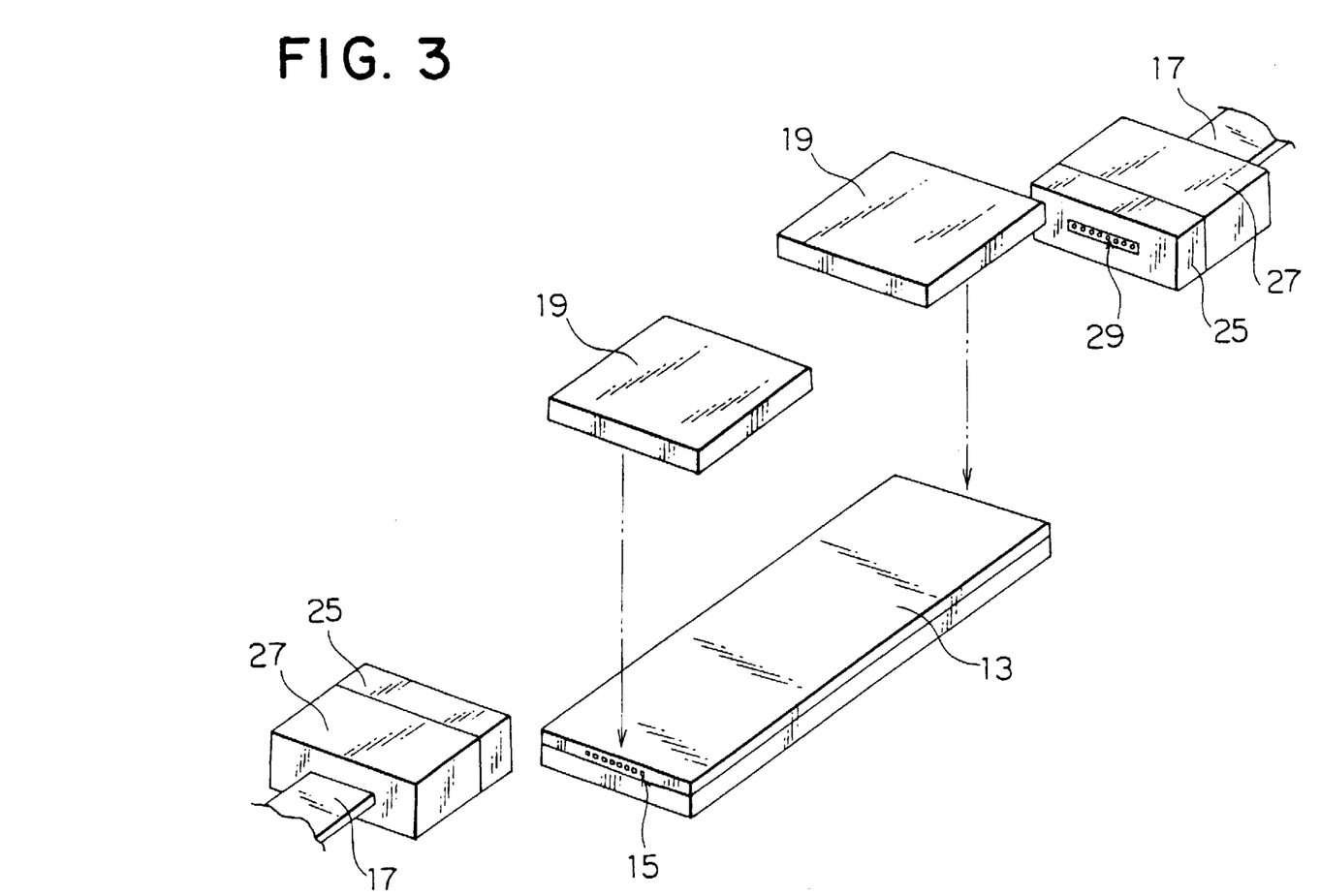
FIG. 3 is a perspective view of an intermediate step in another example of the conventional method of production.

FIG. 2 shows the end of the optical fiber array cable 17 sandwiched between the base 21 and the cover 23, but, as shown in FIG. 3, it has also been proposed to integrally shape a glass frame 25 and a shaped plastic member 27 at the end of the optical fiber array cable 17 so as to enable the use of an ultraviolet curable binder for the connection with the optical waveguide chip 13. In FIG. 3, reference numeral 29 denotes the end face of the optical fiber.

Figure 4A:
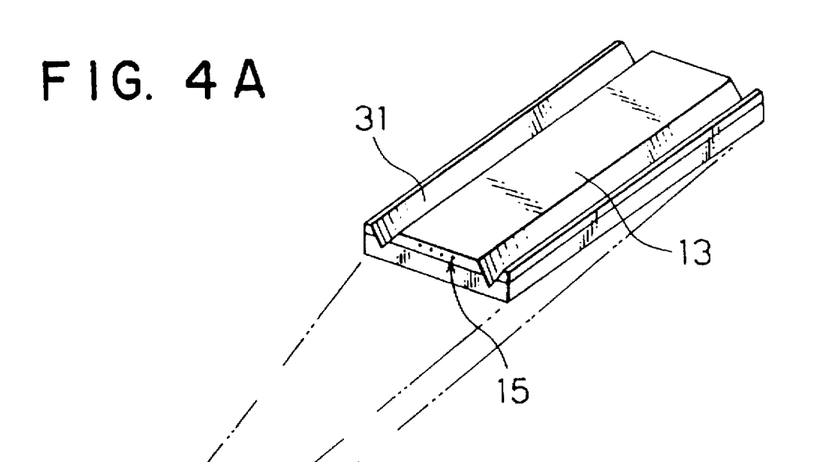
FIG. 4 is a perspective view of an initial step in still another example of the conventional method of production.
Figure 4B:
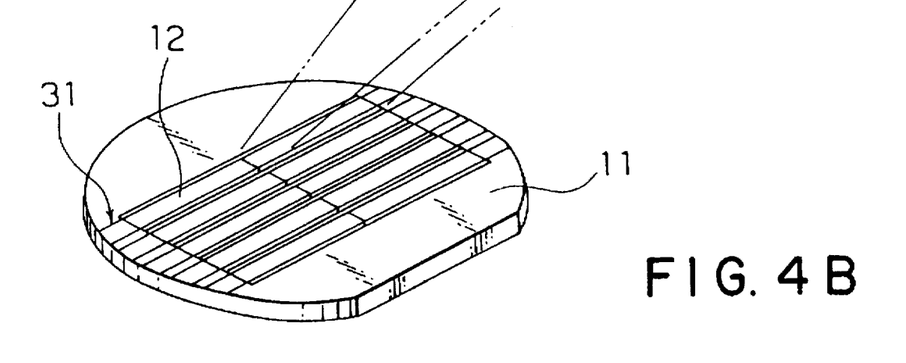
Figure 5:
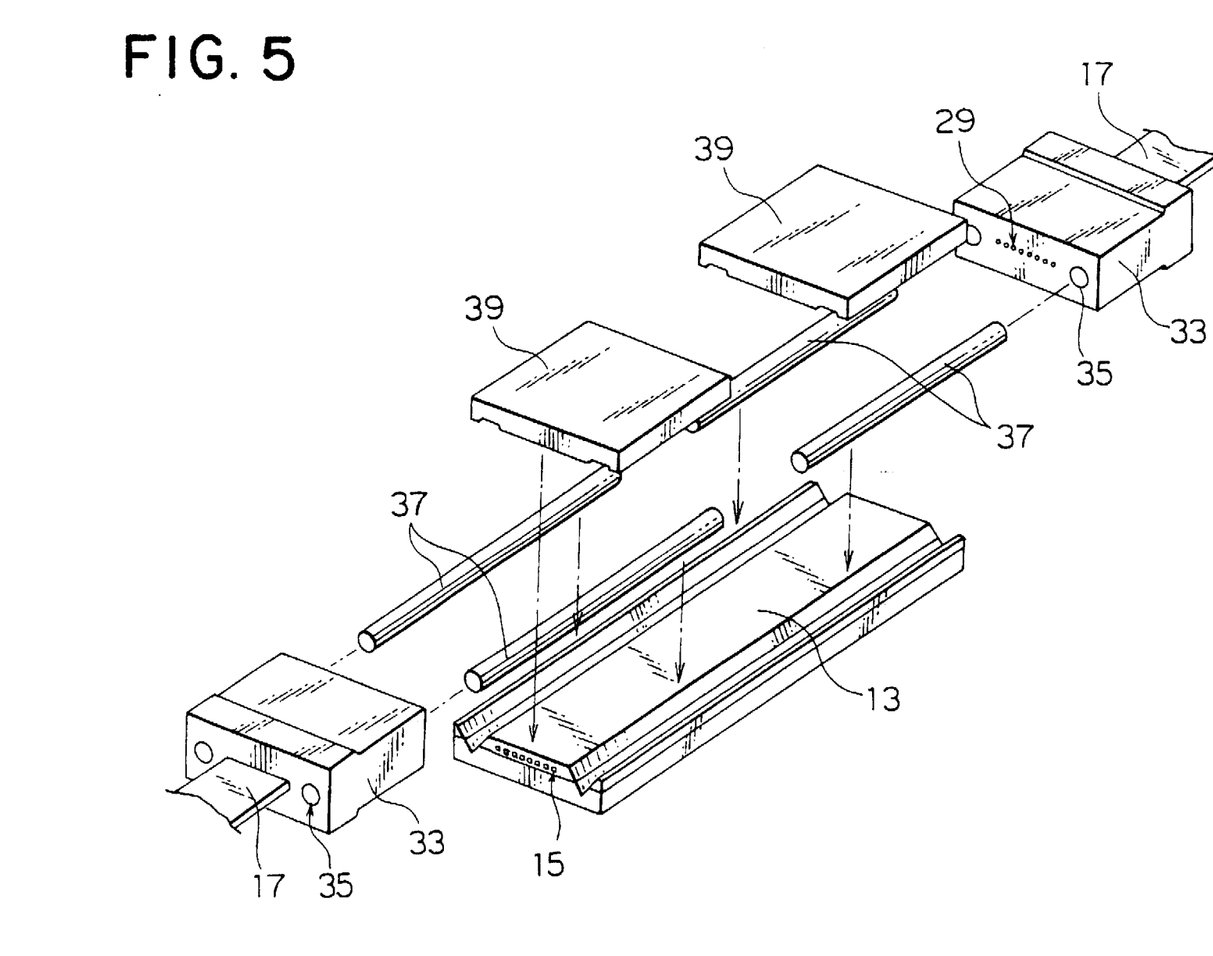
FIG. 5 is a perspective view of an intermediate step of the same.

A method of making an optical waveguide module which does not require centering has been proposed. In this method, first, as shown in FIG. 4, a plurality of optical waveguide patterns 12 are formed on the wafer 11 and positioning grooves (V-Grooves) 31 are formed in the wafer 11 positioned at the two sides of each optical waveguide pattern 12 in parallel to the light axis of the optical waveguide patterns. Next, the wafer 11 is divided by a dicer or the like to obtain an optical waveguide chip 13 with positioning grooves 31. On the other hand, at the end of the optical fiber array cable 17, as shown in FIG. 5, is attached an optical connector 33 having guide pin holes 35 at its two sides. This optical connector 33 and the optical waveguide chip 13 are then connected positioned by the guide pins 37 to make the optical waveguide module. In FIG. 5, reference numeral 39 denotes a cover pressing down on the guide pins 37.

As mentioned above, however, all of the conventional methods of production have problems.

Below, embodiments of the present invention will be explained in detail by referring to the drawings.

Figure 6A:
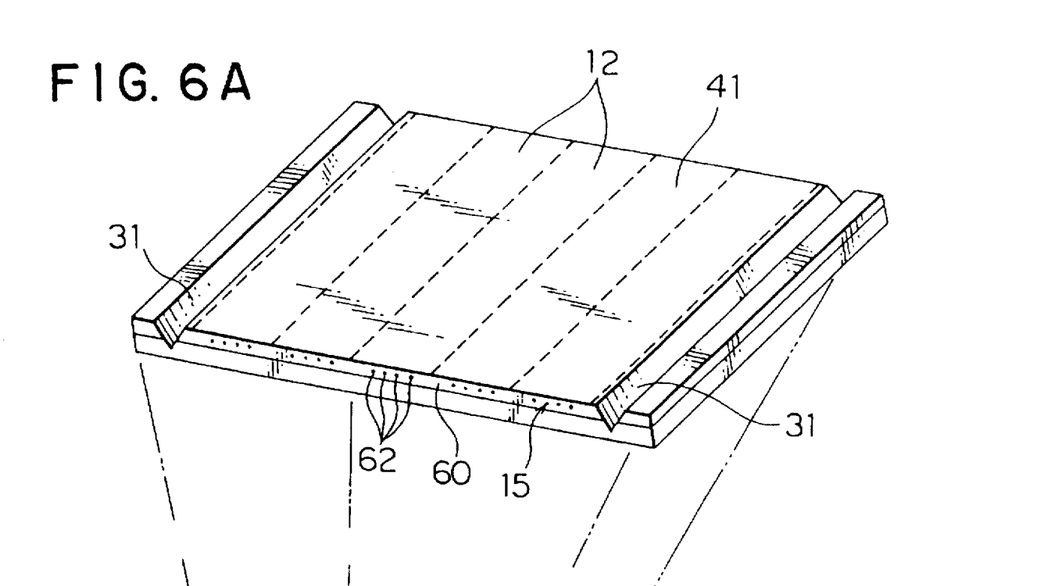
FIG. 6 is a perspective view of an initial step in one embodiment of the method of production of the present invention.
Figure 6B:
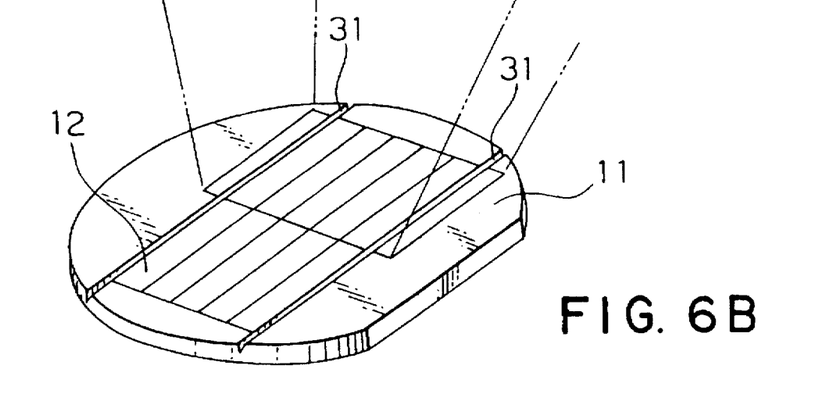
Figure 7:
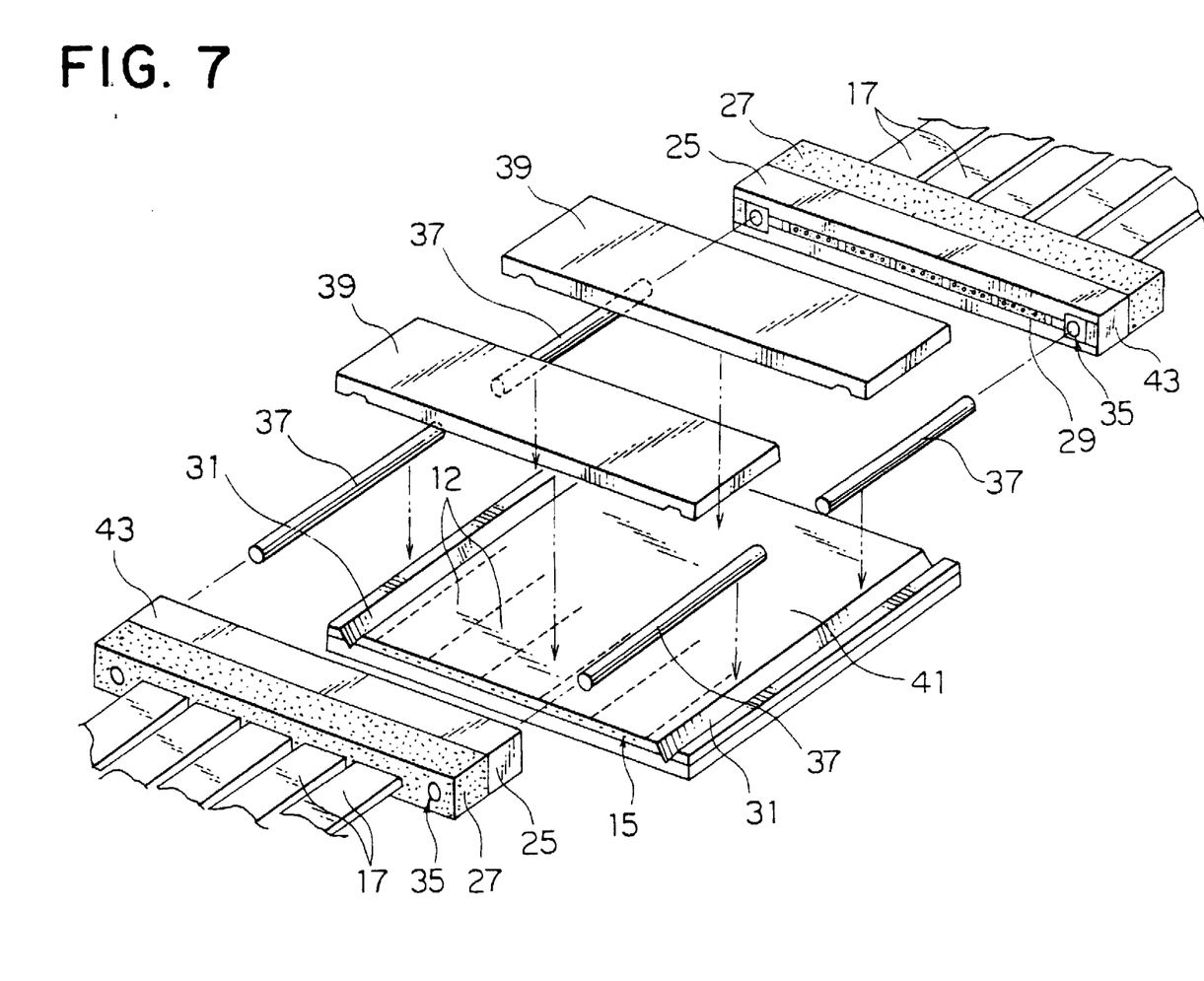
FIG. 7 is a perspective view of an intermediate step in the same embodiment.
Figure 8A:
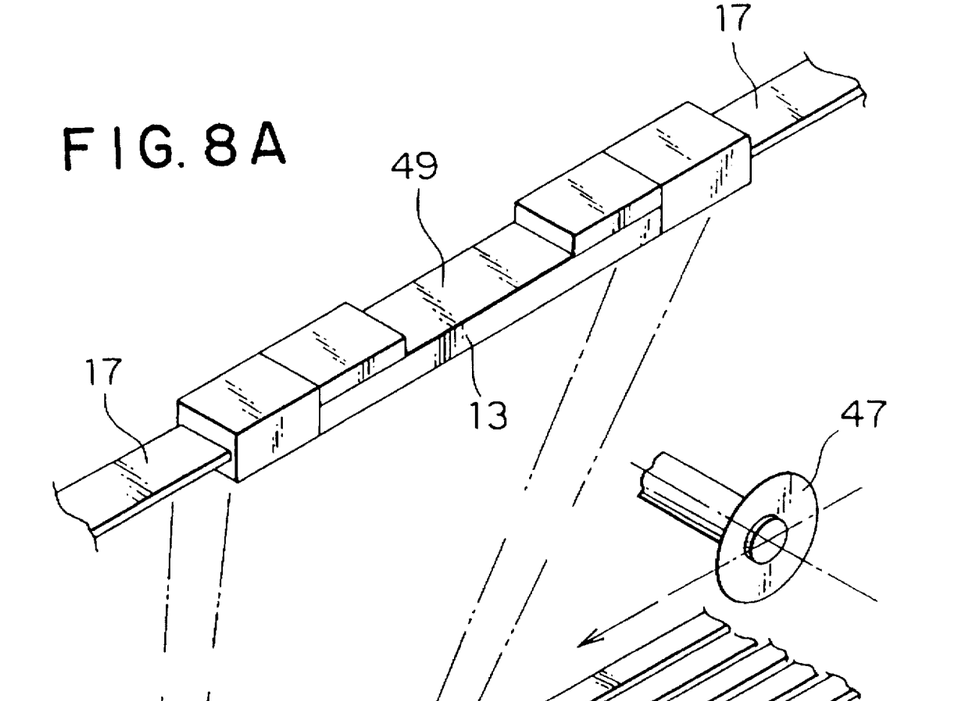
FIG. 8 is a perspective view of a final step in the same embodiment.
Figure 8B:
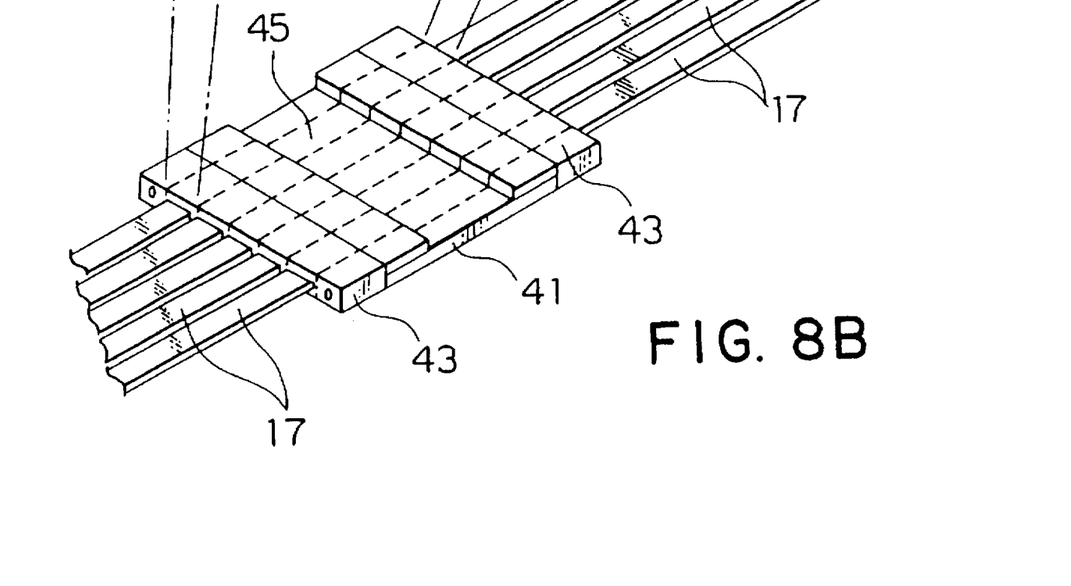

FIG. 6 to FIG. 8 show an embodiment of the present invention.

In this method of production, first, as shown in FIG. 6, on a wafer 11, two sets (one, three, or more sets are also possible) if optical waveguide patterns each comprising a plurality of optical waveguide patterns 12 arranged in parallel are formed in a direction of the optical waveguide pattern 12 (light axis direction). Simultaneously or subsequently, one positioning groove (V-groove) 31 each is formed at the two sides of each set of the optical waveguide patterns 12 in parallel to the direction of the optical waveguide pattern 12.

The wafer 11 is constituted by a wafer made of for example Si. To form the optical waveguide patterns 12 on the surface of this wafer 11, a clad layer 60 is deposited on the wafer and core regions 62 are formed inside the clad layer 60 in a predetermined pattern.

The clad layer 60 and the core regions 62 are constituted by an optically transparent material, more specifically, by silica glass ($SiO_2$), multi-ingredient glass, etc. It is necessary to set the refractive index of the core regions 62 higher than the refractive index of the clad layer 60 so as to guide the light along the longitudinal direction inside the core regions 62. From this viewpoint, it is necessary to make the core regions 62 and the clad layer 60 different in composition. For example, an impurity for changing the optical refractive index may be doped in the portion of the core regions 62 or the clad layer 60.

To form the clad layer 60 with the core regions 62 inside on the wafer 11, for example, a lower clad layer is first formed on the wafer 11. Next, a layer for forming the core regions is formed on the lower clad layer and this layer is subjected to photolithographic processing to obtain the core regions 62 of the pattern of the optical waveguide. Thereafter, an upper clad layer may be formed on this. Alternatively, it is also possible to form the clad layer 60 on the wafer 11, then form a resist film on the clad layer in a predetermined pattern, perform ion implantation of impurities from above this, and thereby form stripe-like core regions 62.

For forming the clad layer 60 or the layer forming the core regions, use may be made of the flame deposition process, CVD process, ion-exchange process, or other processes.

Next, this wafer 11 is cut in a lateral direction at positions corresponding to the two ends of the optical waveguide patterns 12 in the direction so as to prepare an optical waveguide chip assembly 41 with a plurality of optical waveguide patterns 12 corresponding to a plurality of chips and two positioning grooves 31 laterally arranged. An end face 15 of the optical waveguide chip assembly 41 is polished by a usual method. As the polishing method, lapping, etc. can be mentioned. To form the positioning grooves 31, etching or mechanical cutting can be adopted.

As shown in FIG. 7, an optical fiber array assembly 43 having a plurality of optical fiber array cables 17 corresponding to the plurality of optical waveguide patterns 12 of the optical waveguide chip assembly 41 and two guide pin holes 35 corresponding to the two positioning grooves 31 of the optical waveguide chip assembly 41 is prepared. This optical fiber array assembly 43 is prepared by integrally forming a glass frame 25 and a molded plastic member 27 at the ends of the plurality of optical fiber array cables 17 so as to form a package connection type connector. For the integral formation, a means such as insert molding of a plastic etc. is adopted. In FIG. 7, reference numeral 29 denotes the end face of an optical fiber.

The glass frame 25 is insert-molded at the end of the optical fiber array cables 17 so as to enable the use of the ultraviolet-curable binder for bonding with the optical waveguide chip assembly 41. When a heat curable binder is used, it is also possible to use a usual optical connector made of plastic only. The end face of the optical fiber array assembly 43 is polished by a similar method as the polishing of the end face of the optical waveguide chip assembly.

Next, the optical waveguide chip assembly 41 and the optical fiber array assembly 43 are connected positioned by the guide pins 37 and the cover 39 and affixed by an binder. Due to this, an optical waveguide module assembly 45 with a plurality of optical waveguide modules laterally connected as shown in FIG. 8 is obtained.

This assembly 45 is cut along each optical waveguide pattern 12 by the dicer 47 as shown in FIG. 8 so as to obtain individual optical waveguide modules 49 each comprised of a single optical waveguide chip 13 and optical fiber array cable 17. Note that, in the present embodiment, the guide pins are constituted by a metal or a ceramic such as stainless steel, hard metal, and the cover 39 is constituted by glass, metal, etc.

In the above embodiment, one positioning groove 31 each was provided at the two sides of the plurality of optical waveguide patterns 12, but it is also possible to provide positioning grooves between the optical waveguide patterns. Note, when positioning grooves are provided between the optical waveguide patterns, the number of the cut positions is increased when finally dividing the assembly into the individual optical waveguide modules, so the production efficiency is slightly reduced. To improve the positioning precision, desirably the interval between two positioning grooves is set as wide as possible so far as it is allowable in space.

Figure 9:
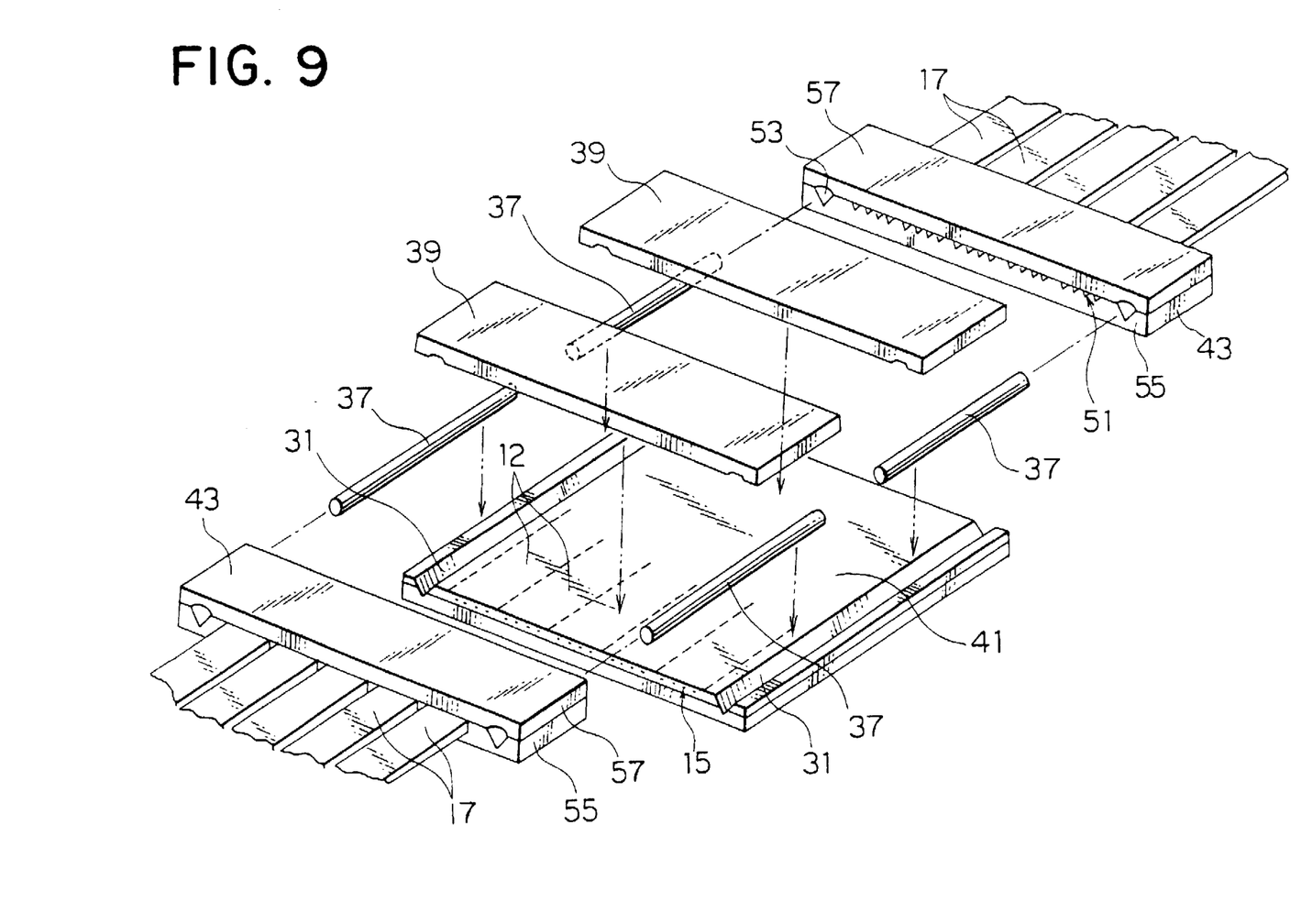
FIG. 9 is a perspective view of an intermediate step in another embodiment of the method of production of the present invention.

Further, in the above embodiment, as the optical fiber array assembly, a package connection type connector in which a glass frame was insert-molded was used, but the optical fiber array assembly of the present invention can have a structure other than this. For example, as shown in FIG. 9, a connector having a structure sandwiching and affixing the optical fibers of the optical fiber array cable 17 between a glass base 55 in which first V-grooves 51 for the positioning of the optical fibers and second V grooves 53 for the positioning of the guide pins and a glass plate 57 can be adopted. Note that, in the embodiment shown in FIG. 9, members the same as those in the embodiment shown in FIG. 7 are given the same reference numerals and overlapping explanations thereof are omitted.

In the case of the embodiment shown in FIG. 9, an ultraviolet-curable binder is used, so the optical fiber array assembly 43 was made by glass, but where another binder, for example, a heat curable binder or anaerobic binder is used, a material other than glass, for example, a ceramic or plastic, can be used as the material constituting the assembly 43.

Further, by selecting the material of the optical waveguide pattern assembly and the optical fiber array assembly, it is also possible to connect the two assemblies by welding, brazing, etc.

As explained above, according to the present invention, a large number of optical waveguide modules can be made with a good efficiency and the mass productivity can be enhanced. Further, since a plurality of optical waveguide modules are made by the same positioning, the variations among products can be reduced.

We claim:

1. A method of production of an optical waveguide module having a plurality of chips comprising the steps of:
    forming on a wafer in parallel to the planar direction a plurality of optical waveguide patterns for every chip with a plurality of core regions formed at the internal portion of a clad layer;
    forming at least two positioning grooves on the wafer in parallel to a longitudinal direction of the optical waveguide patterns;
    cutting the wafer to prepare an optical waveguide chip assembly having an end face, said waveguide chip assembly being formed with a plurality of optical waveguide patterns corresponding to a plurality of chips and at least two positioning grooves;
    preparing an optical fiber array assembly having an end face, said array assembly having a plurality of optical fiber array cables, each said array cables having an end face, wherein said plurality of cables corresponds to each of the plurality of optical waveguide patterns of the optical waveguide chip assembly and at least two positioning portions corresponding to the two positioning grooves of the optical waveguide chip assembly;
    connecting the end face of the optical waveguide chip assembly and optical fiber array assembly while aligning the positioning grooves of the optical waveguide chip assembly with the axial center of the positioning portions of the optical fiber array assembly; and
    dividing the connected optical waveguide chip assembly and optical fiber array assembly into units of individual optical waveguide modules.

2. The method of production of an optical waveguide module as set forth in claim 1, wherein a plurality of optical waveguide patterns of lengths corresponding to at least two optical waveguide chips are formed on said wafer along the longitudinal direction of the optical waveguide patterns and the wafer is cut to obtain at least two optical waveguide chip assemblies.

3. The method of production of an optical waveguide module as set forth in claim 1, wherein a package connection type connector is connected to the end faces of the plurality of optical fiber array cables so as to form an optical fiber array assembly.

4. The method of production of an optical waveguide module as set forth in claim 3, wherein said package connection type connector is integrally formed at the end faces of the plurality of optical fiber array cables so that a glass frame and shaped plastic member are arranged in that order from the frontmost end.

5. The method of production of an optical waveguide module as set forth in claim 4, wherein the end face of said optical waveguide chip assembly and the end face of the optical fiber array assembly are connected using an ultraviolet-curable binder.

6. The method of production of an optical waveguide module as set forth in claim 5, wherein said connector is formed with guide pin holes serving as the positioning portions of said optical fiber array assembly and wherein the positioning relative to said positioning grooves of said optical waveguide chip assembly is carried out by guide pins with one end fit in said guide pin holes and the other end fit in said positioning grooves.

7. The method of production of an optical waveguide module as set forth in claim 6, wherein a cover is bonded to said optical waveguide chip assembly from the top of said optical waveguide chip assembly so as to press down said guide pins at a position where the other ends of said guide pins are fit in the positioning grooves of said optical waveguide chip assembly.

8. The method of production of an optical waveguide module as set forth in claim 3, wherein said package connection type connector is formed so as to sandwich and affix the end of each optical fiber of a plurality of optical fiber array cables between a glass base formed with first grooves for positioning of the optical fibers and second grooves for positioning of guide pins and a glass plate.

9. The method of production of an optical waveguide module as set forth in claim 8, wherein each of one end of the guide pins are inserted into second grooves formed in said connector and each of the other ends of the guide pins are fit in positioning grooves of said optical waveguide chip assembly so as to position said optical waveguide chip assembly and the optical fiber array assembly.

10. The method of production of an optical waveguide module as set forth in claim 9, wherein a cover is bonded to the assembly from the top of said optical waveguide chip assembly so as to press down said guide pins at a position where the other ends of said guide pins are fit in the positioning grooves of said optical waveguide chip assembly.

* * * * *